United States Patent
Gau (10) Patent No.: US 8,134,642 B2
(45) Date of Patent: Mar. 13, 2012

(54) METHOD AND SYSTEM FOR CONVERTING INTERLEAVED VIDEO FIELDS TO PROGRESSIVE VIDEO FRAMES IN SPATIAL DOMAIN

(75) Inventor: Ken Jaung Gau, San Jose, CA (US)

(73) Assignee: Focaltech Systems, Ltd., George Town (KY)

( * ) Notice: Subject to any disclaimer, the term of this patent is extended or adjusted under 35 U.S.C. 154(b) by 1450 days.

(21) Appl. No.: 11/657,357

(22) Filed: Jan. 24, 2007

(65) Prior Publication Data

US 2008/0174695 A1    Jul. 24, 2008

(51) Int. Cl.
H04N 7/01 (2006.01)
H04N 11/20 (2006.01)

(52) U.S. Cl. .................... 348/448; 348/441; 348/452

(58) Field of Classification Search .............. 348/448, 348/441, 452, 459, 457, 458, 616, 620, 699, 348/700; H04N 7/01, 11/20
See application file for complete search history.

(56) References Cited

U.S. PATENT DOCUMENTS

| | | | | |
|---|---|---|---|---|
| 6,459,455 B1* | 10/2002 | Jiang et al. | ...... | 348/452 |
| 6,985,187 B2* | 1/2006 | Han et al. | ...... | 348/452 |
| 7,242,435 B2* | 7/2007 | Lin et al. | ...... | 348/448 |
| 7,277,132 B2* | 10/2007 | Chen et al. | ...... | 348/448 |
| 7,667,773 B2* | 2/2010 | Han | ...... | 348/452 |

* cited by examiner

*Primary Examiner* — Trang U Tran
(74) *Attorney, Agent, or Firm* — Jones Day (57) ABSTRACT

A method for converting interleaved video frames to progressive video frames is disclosed. Each interleaved frame includes two interleaved fields and each interleaved field includes plural pixels. The method comprises fetching a previous interleaved field, a current interleaved field, a next interleaved field, and the second next interleaved field; determining a first difference value by calculating the difference between a block of pixels of the current interleaved field and a corresponding block of pixels of the previous interleaved field, the second difference value by calculating the difference between the block of pixels of the current interleaved field and a corresponding block of pixels of the next interleaved field, and the third difference value by calculating the difference between the block of pixels of the current interleaved field and a corresponding block of pixels of the second next interleaved field; generating a first progressive frame by performing a weave method, the second progressive frame by performing a motion compensation method, and the third progressive frame by performing a bob method; and selecting one of the first, the second, and the third progressive frames to be a current progressive frame based on the first, the second, and the third difference values.

40 Claims, 4 Drawing Sheets

METHOD AND SYSTEM FOR CONVERTING INTERLEAVED VIDEO FIELDS TO PROGRESSIVE VIDEO FRAMES IN SPATIAL DOMAIN

DESCRIPTION OF THE INVENTION

1. Field of the Invention

The present invention relates generally to method and system for converting interleaved video fields to progressive video frames in spatial domain, and more particularly, to method and system for converting interleaved video fields to progressive video frames based on four successive interleaved fields and the block of pixels. The method and system is for use in digital video system, digital television system, and analog television system.

2. Background of the Invention

Analog or digital television systems receive video information in an interleaved format. The conventional receiver employs interleaved sampling which samples each picture frame to be two interleaved fields, i.e., odd field and even field. The interleaved sampling gives rise to several degradations associated with the effect known as interline flicker. Also, it may have shadow effect while displaying video frames in an interleaved way which degrades the performance of television systems.

For digital video systems, digital television systems, and modern analog television systems, video fields are displayed in a progressive way to eliminate the degradations of interleaved sampling. The progressive way is the way of the progressive video frames. A converter is employed to transfer the interleaved video fields to progressive frames. For the converter, the input side is the interleaved video fields and the output side is the progressive video frames.

It is desirable for method and system for converting interleaved video frames to progressive video frames to avoid the degradations of interleaved sampling.

SUMMARY OF THE INVENTION

The present invention is directed to method and system for converting interleaved video fields to progressive video frames in spatial domain that obviate one or more of the problems due to limitations and disadvantages of the related art.

An exemplary embodiment of the present invention discloses a method for converting interleaved video frames to progressive video frames. Each interleaved frame includes two interleaved fields and each interleaved field includes a plurality of pixels. The method comprises fetching a previous interleaved field, a current interleaved field, a next interleaved field, and the second next interleaved field; determining a first difference value by calculating the difference between a block of pixels of the current interleaved field and a corresponding block of pixels of the previous interleaved field, the second difference value by calculating the difference between the block of pixels of the current interleaved field and a corresponding block of pixels of the next interleaved field, and the third difference value by calculating the difference between the block of pixels of the current interleaved field and a corresponding block of pixels of the second next interleaved field; generating a first progressive frame by performing a weave method, the second progressive frame by performing a motion compensation method, and the third progressive frame by performing a bob method; and selecting one of the first, the second, and the third progressive frames to be a current progressive frame based on the first, the second, and the third difference values.

An exemplary embodiment of the present invention discloses a system for converting interleaved video frames to progressive video frames. Each interleaved frame includes two interleaved fields and each interleaved field includes a plurality of pixels. The system comprises a fetch controller to fetch a previous interleaved field, a current interleaved field, a next interleaved field, and the second next interleaved field; a calculating circuit to determine a first difference value by calculating the difference between a block of pixels of the current interleaved field and a corresponding block of pixels of the previous interleaved field, the second difference value by calculating the difference between the block of pixels of the current interleaved field and a corresponding block of pixels of the next interleaved field, and the third difference value by calculating the difference between the block of pixels of the current interleaved field and a corresponding block of pixels of the second next interleaved field; a progressive frame generating circuit to generate a first progressive frame by performing a weave method, the second progressive frame by performing a motion compensation method, and the third progressive frame by performing a bob method; and a selecting circuit to select one of the first, the second, and the third progressive frames to be a current progressive frame based on the first, the second, and the third difference values.

Another exemplary embodiment of the present invention discloses a method for converting a plurality of interleaved frames to a plurality of progressive frames. Each interleaved frame includes two interleaved fields and each interleaved field includes a plurality of pixels. The method comprises fetching a previous interleaved field, a current interleaved field, a next interleaved field, and the second next interleaved field; determining a first difference value by calculating the difference between a block of pixels of the current interleaved field and a corresponding block of pixels of the previous interleaved field, the second difference value by calculating the difference between the block of pixels of the current interleaved field and a corresponding block of pixels of the next interleaved field, and the third difference value by calculating the difference between the block of pixels of the current interleaved field and a corresponding block of pixels of the second next interleaved field; generating a current progressive frame by performing a weave method if the third difference value is smaller than a first threshold value and the third difference value is smaller than at least one of the second difference value and the first difference value; In the case when the third difference value is larger than the first threshold value or the third difference value is larger than both the second difference value and the first difference value, generating the current progressive frame by performing a motion compensation method if at least one of the second difference value and the first difference value is not larger than the second threshold value; and in the case when the third difference value is larger than the first threshold value or the third difference value is larger than both the second difference value and the first difference value, generating the current progressive frame by performing a bob method if both the second difference value and the first difference value are larger than the second threshold value.

Another exemplary embodiment of the present invention discloses a system for converting a plurality of interleaved frames to a plurality of progressive frames. Each interleaved frame includes two interleaved fields and each interleaved field includes a plurality of pixels. The system comprises a fetch controller to fetch a previous interleaved field, a current interleaved field, a next interleaved field, and the second next interleaved field; a calculating circuit to determine a first difference value by calculating the difference between a block of pixels of the current interleaved field and a corresponding block of pixels of the previous interleaved field, the second difference value by calculating the difference between the block of pixels of the current interleaved field and a corresponding block of pixels of the next interleaved field, and the third difference value by calculating the difference between the block of pixels of the current interleaved field and a corresponding block of pixels of the second next interleaved field; and a progressive frame generating circuit to generate a current progressive frame. The progressive frame generating circuit generates the current progressive frame by performing a weave method if the third difference value is smaller than a first threshold value and the third difference value is smaller than at least one of the second difference value and the first difference value. In the case when the third difference value is larger than the first threshold value or the third difference value is larger than both the second difference value and the first difference value, the progressive frame generating circuit generates the current progressive frame by performing a motion compensation method if at least one of the second difference value and the first difference value is not larger than the second threshold value. In the case when the third difference value is larger than the first threshold value or the third difference value is larger than both the second difference value and the first difference value, the progressive frame generating circuit generates the current progressive frame by performing a bob method if both the second difference value and the first difference value are larger than the second threshold value.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to embodiments of the invention, which are illustrated in the accompanying drawings. Wherever possible, the same reference numbers will be used throughout the drawings to refer to the same or like parts.

Figure 1:
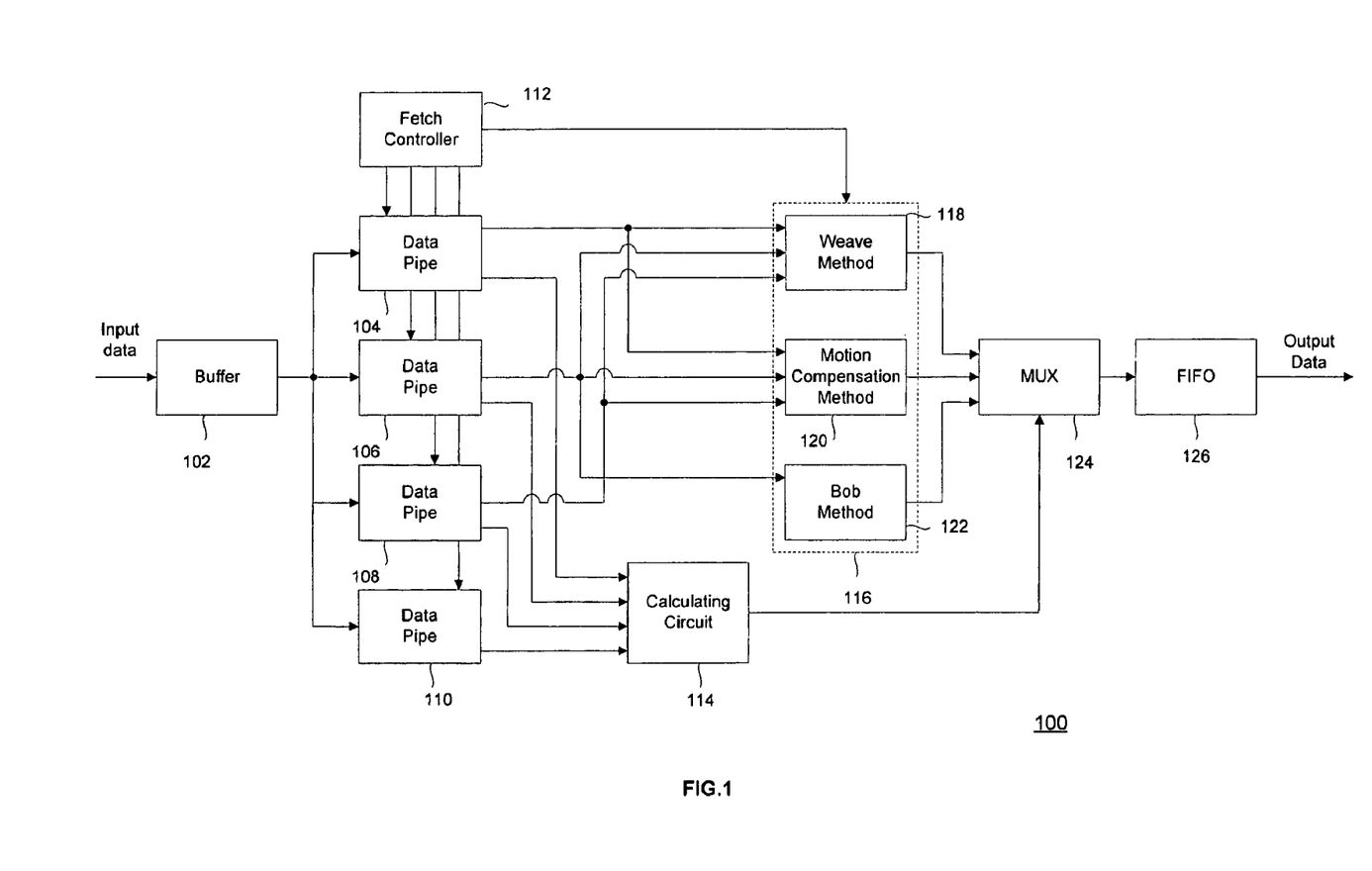
FIG. 1 illustrates a block diagram of a system for converting a plurality of interleaved frames to a plurality of progressive frames according to the first embodiment of the present invention.

Please refer to FIG. 1, which illustrates a block diagram of a system for converting interleaved video frames to progressive video frames 100 which is for use in a digital video system, a digital television system, or an analog television system according to the first embodiment of the present invention. The system 100 includes buffer 102, four data pipes 104, 106, 108, and 110 coupled to buffer 102, fetch controller 112 coupled to each of four data pipes. 104, 106, 108, and 110, calculating circuit 114 coupled to each of four data pipes 104, 106, 108, and 110, progressive frame generating circuit 118 coupled to data pipes 104, 106, 108, and 110 which further includes weave method processor 118, motion compensation method processor 120, and bob method processor 122, selecting circuit 124 coupled to progressive frame generating circuit 118 and calculating circuit 114, and First-In-First-Out buffer (FIFO) 126 coupled to selecting circuit 124.

Figure 2:
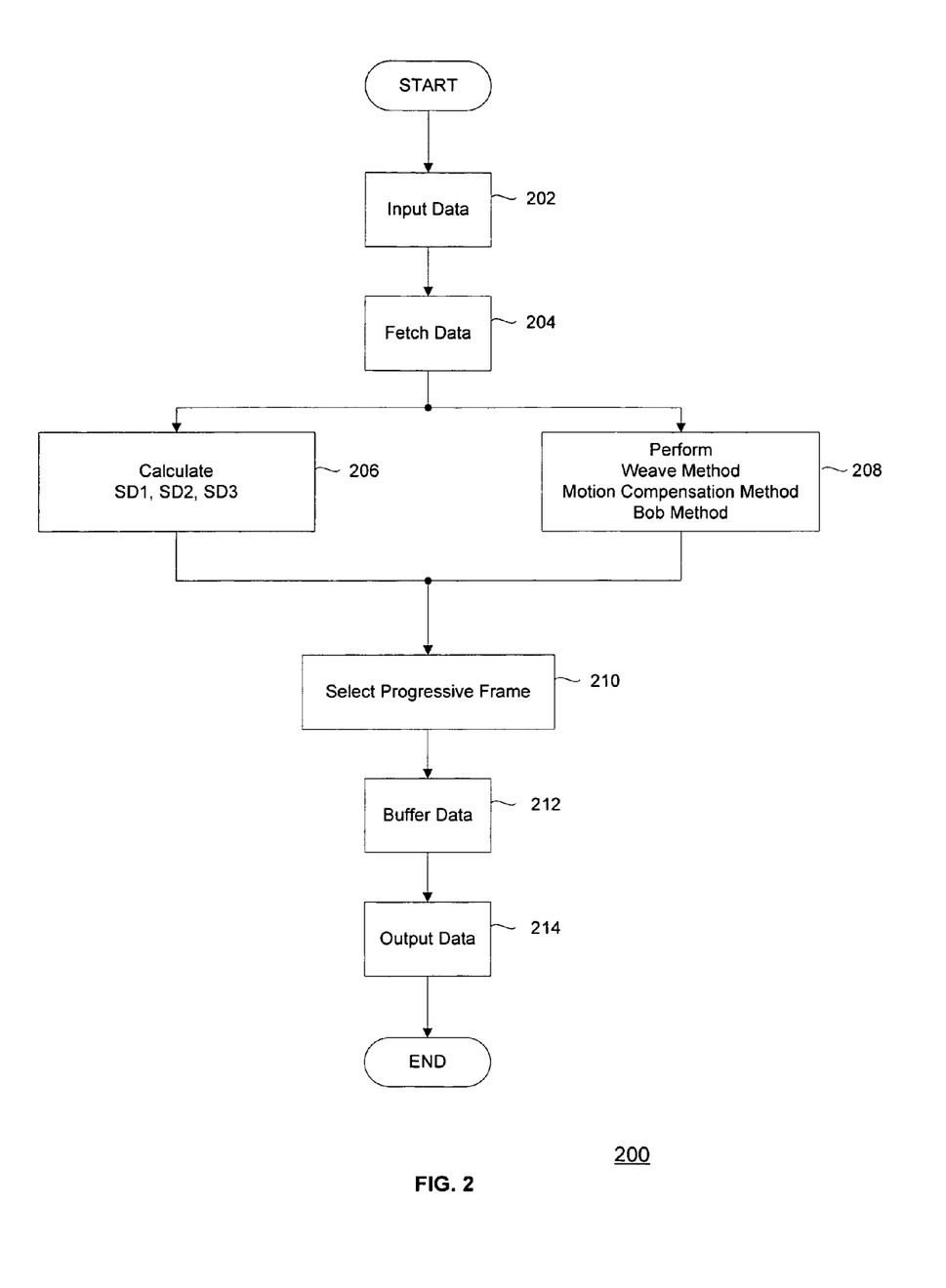
FIG. 2 illustrates a flow chart of a method for converting a plurality of interleaved frames to a plurality of progressive frames according to the first embodiment of the present invention.

Please refer to FIG. 2 which illustrates a flow chart of a method 200 employed by the system 100 for converting interleaved frames to progressive frames. In step 202, input data is inputted and stored in buffer 102. Input data includes plural interleaved video frames. Each interleaved frame includes two interleaved fields, i.e., an odd field and an even field. In addition, each interleaved field includes plural pixels. In the embodiments of the present invention, the input data includes at least four successive interleaved fields which are called previous interleaved field, current interleaved field, the next interleaved field, and the second next interleaved fields.

In step 204, data pipes 104, 106, 108, and 110 are used to fetch previous interleaved field, current interleaved field, next interleaved field, and the second next interleaved field respectively under the control of fetch controller 112.

In step 206, calculating circuit 114 determines the first difference value SD1 which represents the difference between the current interleaved field and the previous interleaved field, the second difference value SD2 which represents the difference between the current interleaved field and the next interleaved field, and the third difference value SD3 which represents the difference between the current interleaved field and the second next interleaved field. In the embodiments of the present invention, the difference between the current interleaved field and the previous interleaved field is determined by calculating the difference between the block of the current interleaved field and a corresponding block of pixels of the previous interleaved field. The block of the pixels of the current interleaved field is a 16×16 rectangle square which includes 256 pixels. The difference between the current interleaved field and the previous interleaved field is determined by calculating the sum of the absolute differences (SAD1) for the 16×16 block (256 pixels). Calculating circuit 114 also determines SAD2 which represents the difference between the current interleaved field and the next interleaved field by calculating the sum of the absolute difference for the corresponding 16×16 block (256 pixels), and SAD3 which represents the difference between the current interleaved field and the second next interleaved field by calculating the sum of the absolute difference for the corresponding 16×16 block (256 pixels). In this condition, the first, the second, and the third difference values SD1, SD2, and SD3 can be represented by SAD1, SAD2, and SAD3, respectively.

In the embodiments of the present invention, the difference between the current interleaved field and the previous interleaved field can also be determined by calculating the sum of the squared errors (SME) for each pixel of the 16×16 block (256 pixels) of the current interleaved field and the corresponding pixel of the corresponding block of the previous interleaved field. In this condition, SME1 can also represent the difference between the current interleaved field and the previous interleaved field. Calculating circuit 114 determines SME2 which represents the difference between the current interleaved field and the next interleaved field by calculating the sum of the squared errors of the corresponding 16×16 block (256 pixels), and SME3 which represents the difference between the current interleaved field and the second next interleaved field by calculating the sum of the squared errors of the corresponding 16×16 block (256 pixels). In this condition, the first, the second, and the third difference values SD1, SD2, and SD3 can be represented by SME1, SME2, and SME3, respectively.

In step 208, progressive frame generating circuit 116 includes weave method processor 118 to generate first progressive frame by performing the weave method, motion compensation method processor 120 to generate the second progressive frame by performing the motion compensation method, and bob method processor 122 to generate the third progressive frame by performing the bob method.

In the embodiments of the present invention, the weave method generates a complete frame by interleaving two successive interleaved fields. In this embodiment, the first progressive frame is generated by interleaving the current interleaved field with either the previous interleaved field or the next interleaved field.

The motion compensation method generates a complete frame based on the motion between two successive frames. When employing the motion compensation method, a motion vector which represents the motion between two successive frames is first determined and then the complete frame is generated by using two successive fields based on the direction and the magnitude of the motion vector. The motion compensation method is suitable for use to generate progressive frames of video signals with motion over successive frames. In this embodiment, the second progressive frame is generated by using the current interleaved field and either the previous interleaved field or the next interleaved field.

The bob method generates a complete frame based on an interleaved field. The missing lines of the complete frame are interpolated from available lines of the interleaved field. The most often used interpolating methods are line repetition, line averaging, and adaptive spatial interpolation. In this embodiment, the third progressive frame is generated by interpolating lines of the current interleaved field.

In step 210, selecting circuit (MUX) 124 selects one of the first, the second, and the third progressive frames to be current progressive frame. If the third difference value (SD3) is smaller than a first threshold value and the third difference value (SD3) is smaller than at least one of the second difference value (SD2) and the first difference value (SD1). In this condition, the first progressive frame which is generated based on the weave method is selected to be the current progressive frame.

In the case when the third difference value (SD3) is larger than the first threshold value or the third difference value (SD3) is larger than both of the second difference value (SD2) and the first difference value (SD1), if at least one of the second difference value (SD2) and the first difference value (SD1) is not larger than the second threshold value. There is a motion vector over two successive frames. In this condition, the second progressive frame which is generated by using motion compensation method is selected to be the current progressive frame.

In the embodiment of the present invention, the second progressive frame can be generated based on the current interleaved field and either one of the previous interleaved field and the next interleaved field. If the first difference value (SD1) is smaller than the second difference value (SD2) and the first difference value (SD1) is not larger than the second threshold. In this condition, the second progressive frame should be generated by performing the motion compensation method based on the current interleaved field and the previous interleaved field. However, if the first difference value (SD1) is larger than the second difference value (SD2) and the second difference value (SD2) is not larger than the second threshold. In this condition, the second progressive frame should be generated by performing the motion compensation method based on the current interleaved field and the next interleaved field.

In the case when the third difference value (SD3) is larger than the first threshold value or the third difference value (SD3) is larger than the second difference value (SD2) and the first difference value (SD1), if both the second difference value (SD2) and the first difference value (SD1) are larger than the second threshold value. In this condition, the third progressive frame which is generated by performing the bob method should be selected to be the current progressive frame because there is a significant motion over successive frames.

In step 212, the selected current progressive frame is stored in a FIFO 126. In step 214, the current progressive frame is outputted from FIFO 126.

Figure 3:
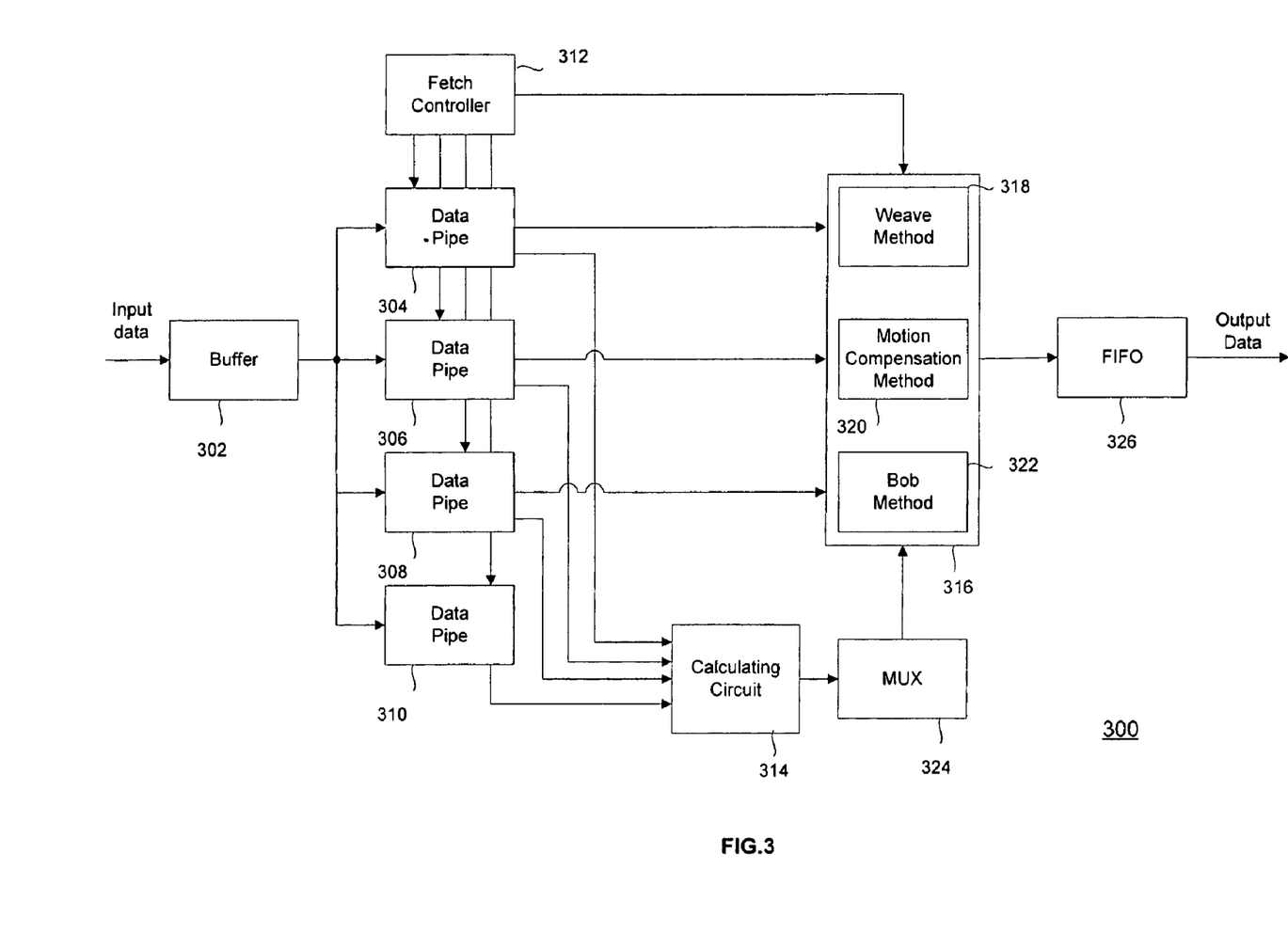
FIG. 3 illustrates a block diagram of a system for converting a plurality of interleaved frames to a plurality of progressive frames according to the second embodiment of the present invention.

Please refer to FIG. 3 which illustrates a block diagram of a system for converting interleaved video frames to progressive video frames 300 for use in a digital video system, a digital television system, or an analog television system according to the second embodiment of the present invention. The system 300 includes buffer 302, four data pipes 304, 306, 308, and 310 coupled to buffer 302, fetch controller 312 coupled to each of four data pipes 304, 306, 308, and 310, calculating circuit 314 coupled to each of four data pipes 304, 306, 308, and 310, progressive frame generating circuit 318 coupled to data pipes 304, 306, 308, and 310 which further includes weave method processor 318, motion compensation processor 320, and bob method processor 322, selecting circuit 324 coupled to progressive frame generating circuit 318 and calculating circuit 314, and First-In-First-Out buffer (FIFO) 326 coupled to progressive frame generating circuit 318.

Figure 4:
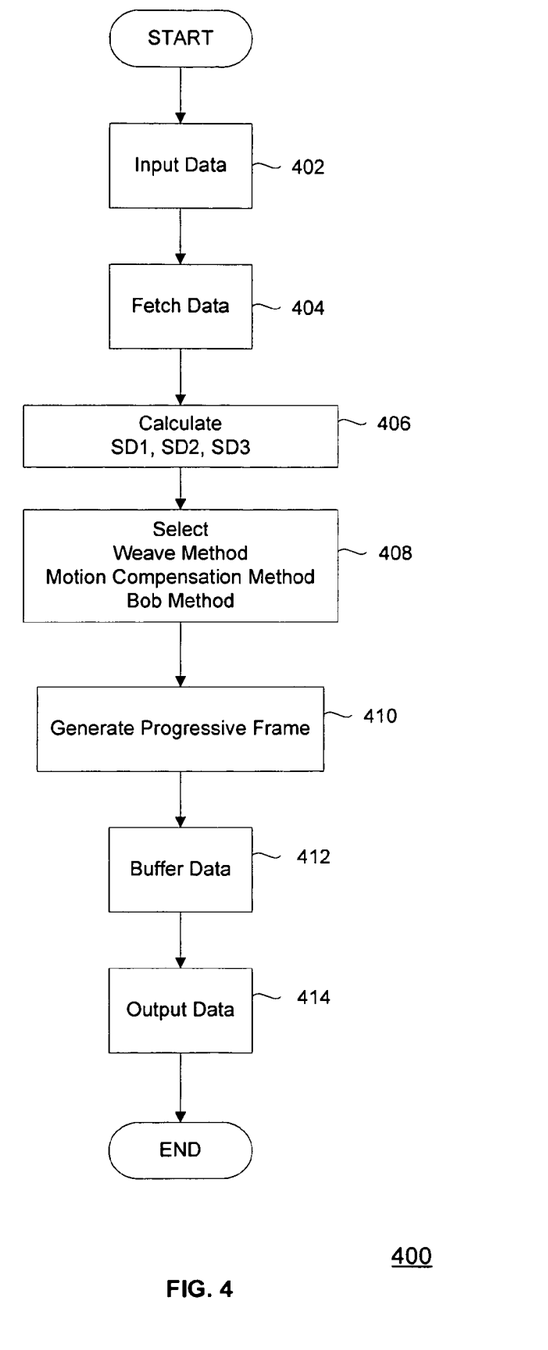
FIG. 4 illustrates a flow chart of a method for converting a plurality of interleaved frames to a plurality of progressive frames according to the second embodiment of the present invention.

Please refer to FIG. 4 which illustrates a flow chart of a method 400 employed by the system 300 for converting interleaved video frames to progressive video frames according to the second embodiment of the present invention. The steps 402, 404, and 406 of the method 400 of the second embodiment of the present invention are substantially the same with the steps 202, 204, and 206 of the method 200 of the first embodiment of the present invention, respectively. Please refer to the above description for reference. One of the differences between the first embodiment and the second embodiment is that progressive frame generating circuit 316 performs only one of the weave method, motion compensation method and bob method under the control of selecting circuit (MUX) 324 in step 408 of the second embodiment. However, in step 208 of the first embodiment, progressive frame generating circuit 316 generates three progressive frames by performing the weave method, motion compensation method and bob method and selecting circuit (MUX) 324 is used to select one of the three progressive frames.

In step 410, progressive frame generating circuit 316 generates the only one progressive frame to be the current progressive frame. In step 412, the current progressive frame is stored in FIFO 326. In step 414, the current progressive frame is outputted from FIFO 326.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method for converting a plurality of interleaved frames to a plurality of progressive frames, wherein each interleaved frame includes two interleaved fields and each interleaved field includes a plurality of pixels, comprising:
    fetching a previous interleaved field, a current interleaved field, a next interleaved field, and a second next interleaved field;
    determining a first difference value by calculating the difference between a block of pixels of the current interleaved field and a corresponding block of pixels of the previous interleaved field, a second difference value by calculating the difference between the block of pixels of the current interleaved field and a corresponding block of pixels of the next interleaved field, and a third difference value by calculating the difference between the block of pixels of the current interleaved field and a corresponding block of pixels of the second next interleaved field;
    generating a first progressive frame by performing a weave method, a second progressive frame by performing a motion compensation method, and a third progressive frame by performing a bob method; and
    selecting one of the first, the second, and the third progressive frames to be a current progressive frame based on the first, the second, and the third difference values.

2. The method according to claim 1, wherein the first, the second, and the third difference values are determined by calculating a sum of the absolute differences (SAD) for each pixel of the block of the current interleaved field and the corresponding pixel of the corresponding block of the previous interleaved field, the next interleaved field, and the second next interleaved field, respectively.

3. The method according to claim 1, wherein the first, the second, and the third difference values are determined by calculating a sum of the squared errors (SME) for each pixel of the block of the current interleaved field and the corresponding pixel of the corresponding block of the previous interleaved field, the next interleaved field, and the second next interleaved field, respectively.

4. The method according to claim 1, wherein the first progressive frame is selected to be the current progressive frame if the third difference value is smaller than a first threshold value and the third difference value is smaller than at least one of the second difference value and the first difference value.

5. The method according to claim 4, wherein the first progressive frame is generated by interleaving the current interleaved field with either one of the previous interleaved field and the next interleaved field.

6. The method according to claim 1, wherein in the case when the third difference value is larger than a first threshold value or the third difference value is larger than both of the second difference value and the first difference value, the second progressive frame is selected to be the current progressive frame if at least one of the second difference value and the first difference value is not larger than a second threshold value.

7. The method according to claim 6, wherein the second progressive frame is generated by performing the motion compensation method based on the current interleaved field and the previous interleaved field if the first difference value is larger than the second difference value and the first difference value is not larger than the second threshold.

8. The method according to claim 6, wherein the second progressive frame is generated by performing the motion compensation method based on the current interleaved field and the next interleaved field if the first difference value is smaller than the second difference value and the second difference value is not larger than the second threshold.

9. The method according to claim 1, wherein in the case when the third difference value is larger than a first threshold value or the third difference value is larger than both of the second difference value and the first difference value, the third progressive frame is selected to be the current progressive frame if both the second difference value and the first difference value are larger than a second threshold value.

10. The method according to claim 1, wherein the third progressive frame is generated based on the current interleaved field.

11. A system for converting a plurality of interleaved frames to a plurality of progressive frames, wherein each interleaved frame includes two interleaved fields and each interleaved field includes a plurality of pixels, comprising:
    a fetch controller to fetch a previous interleaved field, a current interleaved field, a next interleaved field, and a second next interleaved field;
    a calculating circuit to determine a first difference value by calculating the difference between a block of pixels of the current interleaved field and a corresponding block of pixels of the previous interleaved field, a second difference value by calculating the difference between the block of pixels of the current interleaved field and a corresponding block of pixels of the next interleaved field, and a third difference value by calculating the difference between the block of pixels of the current interleaved field and a corresponding block of pixels of the second next interleaved field;
    a progressive frame generating circuit to generate a first progressive frame by performing a weave method, a second progressive frame by performing a motion compensation method, and a third progressive frame by performing a bob method; and
    a selecting circuit to select one of the first, the second, and the third progressive frames to be a current progressive frame based on the first, the second, and the third difference values.

12. The system according to claim 11, wherein the calculating circuit determines the first, the second, and the third difference values by calculating a sum of the absolute differences (SAD) for each pixel of the block of the current interleaved field and the corresponding pixel of the corresponding block of the previous interleaved field, the next interleaved field, and the second next interleaved field, respectively.

13. The system according to claim 11, wherein the calculating circuit determines the first, the second, and the third difference values by calculating a sum of the squared errors (SME) for each pixel of the block of the current interleaved field and the corresponding pixel of the corresponding block of the previous interleaved field, the next interleaved field, and the second next interleaved field, respectively.

14. The system according to claim 11, wherein the selecting circuit selects the first progressive frame to be the current progressive frame if the third difference value is smaller than a first threshold value and the third difference value is smaller than at least one of the second difference value and the first difference value.

15. The system according to claim 14, wherein the progressive frame generating circuit generates the first progressive frame by interleaving the current interleaved field with either one of the previous interleaved field and the next interleaved field.

16. The system according to claim 11, wherein in the case when the third difference value is larger than a first threshold value or the third difference value is larger than the second difference value and the first difference value, the selecting circuit selects the second progressive frame to be the current progressive frame if at least one of the second difference value and the first difference value is not larger than a second threshold value.

17. The system according to claim 16, wherein the progressive frame generating circuit generates the second progressive frame by performing the motion compensation method based on the current interleaved field and the previous interleaved field if the first difference value is larger than the second difference value and the first difference value is not larger than the second threshold.

18. The system according to claim 16, wherein the progressive frame generating circuit generates the second progressive frame by performing the motion compensation method based on the current interleaved field and the next interleaved field if the first difference value is smaller than the second difference value and the second difference value is not larger than the second threshold.

19. The system according to claim 11, wherein in the case when the third difference value is larger than a first threshold value or the third difference value is larger than the second difference value and the first difference value, the selecting circuit selects the third progressive frame to be the current progressive frame if both the second difference value and the first difference value are larger than a second threshold value.

20. The system according to claim 11, wherein the third progressive interleaved field is generated based on the current interleaved field.

21. The system according to claim 11, wherein the system further includes a first buffer to store the previous, current, next, and the second next interleaved fields.

22. The system according to claim 11, wherein the system further includes a second buffer to store the current progressive frame.

23. The system according to claim 11, the system is for use in a digital video system, a digital television system, or an analog television system.

24. A method for converting a plurality of interleaved frames to a plurality of progressive frames, wherein each interleaved frame includes two interleaved fields and each interleaved field includes a plurality of pixels, comprising:
fetching a previous interleaved field, a current interleaved field, a next interleaved field, and a second next interleaved field;
determining a first difference value by calculating the difference between a block of pixels of the current interleaved field and a corresponding block of pixels of the previous interleaved field, a second difference value by calculating the difference between the block of pixels of the current interleaved field and a corresponding block of pixels of the next interleaved field, and a third difference value by calculating the difference between the block of pixels of the current interleaved field and a corresponding block of pixels of the second next interleaved field;
generating a current progressive frame by performing a weave method if the third difference value is smaller than a first threshold value and the third difference value is smaller than at least one of the second difference value and the first difference value; and
in the case when the third difference value is larger than the first threshold value or the third difference value is larger than both of the second difference value and the first difference value, generating the current progressive frame by performing a motion compensation method if at least one of the second difference value and the first difference value is not larger than a second threshold value, and generating the current progressive frame by performing a bob method if both the second difference value and the first difference value are larger than the second threshold value.

25. The method according to claim 24, wherein the first, the second, and the third difference values are determined by calculating a sum of the absolute differences (SAD) for each pixel of the block of the current interleaved field and the corresponding pixel of the corresponding block of the previous interleaved field, the next interleaved field, and the second next interleaved field, respectively.

26. The method according to claim 24, wherein the first, the second, and the third difference values are determined by calculating a sum of the squared errors (SME) for each pixel of the block of the current interleaved field and the corresponding pixel of the corresponding block of the previous interleaved field, the next interleaved field, and the second next interleaved field, respectively.

27. The method according to claim 24, wherein if the current progressive frame is generated by performing the weave method, the current interleaved field is interleaved with either the previous interleaved field or the next interleaved field.

28. The method according to claim 24, wherein the current progressive frame is generated by performing the motion compensation method based on the current interleaved field and the previous interleaved field if the first difference value is larger than the second difference value and the first difference value is not larger than the second threshold.

29. The method according to claim 24, wherein the current progressive frame is generated by performing the motion compensation method based on the current interleaved field and the next interleaved field if the first difference value is smaller than the second difference value and the second difference value is not larger than the second threshold.

30. The method according to claim 24, wherein if the current progressive frame is generated by performing the motion compensation method, the current progressive frame is generated based on the current interleaved field.

31. A system for converting a plurality of interleaved frames to a plurality of progressive frames, wherein each interleaved frame includes two interleaved fields and each interleaved field includes a plurality of pixels, comprising:
a fetch controller to fetch a previous interleaved field, a current interleaved field, a next interleaved field, and a second next interleaved field;
a calculating circuit to determine a first difference value by calculating the difference between a block of pixels of the current interleaved field and a corresponding block of pixels of the previous interleaved field, a second difference value by calculating the difference between the block of pixels of the current interleaved field and a corresponding block of pixels of the next interleaved field, and a third difference value by calculating the difference between the block of pixels of the current interleaved field and a corresponding block of pixels of the second next interleaved field; and a progressive frame generating circuit to generate a current progressive frame; wherein the progressive frame generating circuit generates the current progressive frame by performing a weave method if the third difference value is smaller than a first threshold value and the third difference value is smaller than at least one of the second difference value and the first difference value;

wherein in the case when the third difference value is larger than the first threshold value or the third difference value is larger than both of the second difference value and the first difference value, the progressive frame generating circuit generate the current progressive frame by performing a motion compensation method if at least one of the second difference value and the first difference value is not larger than a second threshold value, and the progressive frame generating circuit generates the current progressive frame by performing a bob method if both the second difference value and the first difference value are larger than the second threshold value.

32. The system according to claim 31, wherein the calculating circuit determines the first, the second, and the third difference values by calculating a sum of the absolute differences (SAD) for each pixel of the block of the current interleaved field and the corresponding pixel of the corresponding block of the previous interleaved field, the next interleaved field, and the second next interleaved field, respectively.

33. The system according to claim 31, wherein the calculating circuit determines the first, the second, and the third difference values by calculating a sum of the squared errors (SME) for each pixel of the block of the current interleaved field and the corresponding pixel of the corresponding block of the previous interleaved field, the next interleaved field, and the second next interleaved field, respectively.

34. The system according to claim 31, wherein if the progressive frame generating circuit generates the current progressive frame by performing the weave method, the progressive frame generating circuit interleaves the current interleaved field with either one of the previous interleaved field and the next interleaved field.

35. The system according to claim 31, wherein the progressive frame generating circuit generates the current progressive frame by performing the motion compensation method based on the current interleaved field and the previous interleaved field if the first difference value is larger than the second difference value and the first difference value is not larger than the second threshold.

36. The system according to claim 31, wherein the progressive frame generating circuit generates the current progressive frame by performing the motion compensation method based on the current interleaved field and the next interleaved field if the first difference value is smaller than the second difference value and the second difference value is not larger than the second threshold.

37. The system according to claim 31, wherein if the progressive frame generating circuit generates the current progressive frame by performing the bob method, the current progressive frame is generated based on the current interleaved field.

38. The system according to claim 31, wherein the system further includes a first buffer to store the previous, current, next, and the second next interleaved fields.

39. The system according to claim 31, wherein the system further includes a second buffer to store the current progressive frame.

40. The system according to claim 31, the system is for use in a digital video system, a digital television system, or an analog television system.

* * * * *